US 9,458,290 B2

(12) United States Patent
Isahaya et al.

(10) Patent No.: US 9,458,290 B2
(45) Date of Patent: Oct. 4, 2016

(54) PROCESS FOR PREPARING HIGHLY POLYMERIZED AROMATIC POLYCARBONATE RESIN

(71) Applicant: MITSUBISHI GAS CHEMICAL COMPANY, INC., Tokyo (JP)

(72) Inventors: Yoshinori Isahaya, Ibaraki (JP); Atsushi Hirashima, Chiba (JP); Hidefumi Harada, Hyogo (JP); Maki Ito, Ibaraki (JP); Jun-ya Hayakawa, Chiba (JP); Takehiko Isobe, Chiba (JP); Taichi Tokutake, Tokyo (JP); Yousuke Shinkai, Chiba (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/441,956

(22) PCT Filed: Nov. 15, 2013

(86) PCT No.: PCT/JP2013/080868
§ 371 (c)(1),
(2) Date: May 11, 2015

(87) PCT Pub. No.: WO2014/077351
PCT Pub. Date: May 22, 2014

(65) Prior Publication Data
US 2015/0322203 A1 Nov. 12, 2015

(30) Foreign Application Priority Data
Nov. 17, 2012 (JP) ................. 2012-252794

(51) Int. Cl.
C08G 64/00 (2006.01)
C08G 64/06 (2006.01)
C08G 64/04 (2006.01)
C08G 64/42 (2006.01)
C08G 64/30 (2006.01)
C08G 63/02 (2006.01)

(52) U.S. Cl.
CPC ............ C08G 64/06 (2013.01); C08G 64/04 (2013.01); C08G 64/305 (2013.01); C08G 64/42 (2013.01)

(58) Field of Classification Search
CPC ............................ C08G 64/06; C08G 64/307
USPC ......................... 528/196, 198, 370
See application file for complete search history.

(56) References Cited

U.S. PATENT DOCUMENTS

| | | | |
|---|---|---|---|
| 3,342,880 A * | 9/1967 | Reinhardt | C07C 17/10 526/282 |
| 3,378,587 A * | 4/1968 | Reinhardt | C07C 17/10 564/456 |
| 3,535,280 A | 10/1970 | Schnell et al. | |
| 5,521,275 A | 5/1996 | McCloskey et al. | |
| 5,696,222 A | 12/1997 | Kaneko et al. | |
| 6,300,459 B1 | 10/2001 | Kaneko et al. | |
| 8,674,053 B2 * | 3/2014 | Isahaya | C08G 64/42 528/196 |
| 8,969,505 B2 | 3/2015 | Isahaya et al. | |
| 2013/0197166 A1 | 8/2013 | Isahaya et al. | |
| 2014/0206826 A1 | 7/2014 | Isahaya et al. | |

FOREIGN PATENT DOCUMENTS

| | | | |
|---|---|---|---|
| EP | 0 595 608 | 5/1994 | |
| EP | 1363962 | 11/2003 | |
| JP | 50-19600 | 7/1975 | |
| JP | 2-153923 | 6/1990 | |
| JP | 6-94501 | 11/1994 | |
| JP | 3271353 | 1/2002 | |
| JP | 3301453 | 4/2002 | |
| JP | 3317555 | 6/2002 | |
| JP | 4112979 | 4/2008 | |
| JP | 2008-514754 | 5/2008 | |
| JP | 4286914 | 4/2009 | |
| JP | 2009-102536 | 5/2009 | |
| WO | 2006-036545 | 4/2006 | |
| WO | 2011/051110 | 5/2011 | |
| WO | 2011/062220 | 5/2011 | |
| WO | WO 2011062220 | * 5/2011 | ........... C08G 64/305 |
| WO | 2012/108510 | 8/2012 | |
| WO | 2012/157766 | 11/2012 | |

OTHER PUBLICATIONS

Search report from International Bureau of WIPO Application No. PCT/JP2003/080868, mail date is Dec. 10, 2013.

* cited by examiner

Primary Examiner — Terressa Boykin
(74) Attorney, Agent, or Firm — Greenblum & Bernstein, P.L.C.

(57) ABSTRACT

The present invention provides a process for preparing a highly polymerized aromatic polycarbonate resin which not only has excellent quality such that it has high molecular weight and high fluidity, but also has more excellent heat resistance. The process of the present invention comprises a highly polymerizing step for reacting an aromatic polycarbonate prepolymer with an aliphatic diol compound of the following formula (I) having hydroxymethyl groups (HO—$CH_2$—) each bonded to a quaternary carbon atom in the presence of a transesterification catalyst to obtain a highly polymerized aromatic polycarbonate resin:

$$HO-CH_2-\underset{\underset{R_d}{|}}{\overset{\overset{R_c}{|}}{(C)}}_m-\underset{\underset{R_f}{|}}{\overset{\overset{R_e}{|}}{(C)}}_n-\underset{\underset{R_b}{|}}{\overset{\overset{R_a}{|}}{C}}-CH_2-OH \qquad (I)$$

wherein Ra to Rf, n, and m are as defined in the present specification and claims.

5 Claims, No Drawings

PROCESS FOR PREPARING HIGHLY POLYMERIZED AROMATIC POLYCARBONATE RESIN

TECHNICAL FIELD

The present invention relates to a process for preparing a highly polymerized aromatic polycarbonate resin. More particularly, the present invention is concerned with a process for preparing an aromatic polycarbonate resin, which comprises a highly polymerizing step for reacting an aromatic polycarbonate prepolymer with an aliphatic diol compound having a specific structure to obtain a highly polymerized aromatic polycarbonate resin.

BACKGROUND ART

A polycarbonate is excellent in heat resistance, impact resistance and transparency, so that, in recent years, it has been widely used in many fields.

In a preparation process of the polycarbonate, many investigations have heretofore been done. Among these, a polycarbonate derived from an aromatic dihydroxy compound, for example, 2,2-bis(4-hydroxyphenyl)propane (hereinbelow, also referred to as "bisphenol A") has been industrially produced by any preparation processes of the interfacial polymerization method or the melt polymerization method.

According to the interfacial polymerization method, the polycarbonate is produced from bisphenol A and phosgene, but poisonous phosgene must be used. Also, there remain the problems that the apparatus is corroded by a chlorine-containing compound such as by-produced hydrogen chloride and sodium chloride, and methylene chloride used as the solvent with a large amount, etc., and that removal of the impurities such as sodium chloride, etc., and remaining methylene chloride which cause effects on the polymer physical property, is difficult.

On the other hand, as a method for preparing a polycarbonate from an aromatic dihydroxy compound and a diaryl carbonate, for example, it has been known a melt polymerization method from long ago in which bisphenol A and diphenyl carbonate are polymerized in a melt state by transesterification, while removing the by-produced aromatic monohydroxy compound. The melt polymerization method has merits that it does not use a solvent, etc., different from the interfacial polymerization method. However, the melt polymerization method has a fundamental problem in that, as the polymerization proceeds, the polymer being produced in the system is rapidly increased in viscosity, so that it becomes difficult to efficiently remove the by-produced aromatic monohydroxy compound from the system, and thus the reaction rate is markedly lowered, making it difficult to increase the polymerization degree.

For solving this problem, various methods of removing the aromatic monohydroxy compound from the high-viscosity polymer have been studied. For example, patent document 1 (JP S50-19600B) discloses a screw polymerizer having a vent portion, and further patent document 2 (JP H2-153923A) discloses a method using a combination of a thin film evaporation apparatus and a horizontal polymerization apparatus.

Further, patent document 3 (U.S. Pat. No. 5,521,275B) discloses a method in which the molecular weight conversion of an aromatic polycarbonate is conducted in the presence of a catalyst under reduced pressure conditions using an extruder having a polymer seal portion and a vent portion.

However, by the methods disclosed in these patent documents, a polycarbonate having a satisfactorily increased molecular weight cannot be obtained. The above-mentioned method using a large amount of a catalyst or polymerization performed under severe conditions such that the polymer being produced is under high shear adversely affects the resin, for example, causes the deterioration of hue of the resin or causes a crosslinking reaction in the resin.

Furthermore, with respect to the melt polymerization method, it has been known that the polymerization degree of a polycarbonate is increased by adding a polymerization promoter to the reaction system. The increase of the molecular weight of polycarbonate achieved in a shortened reaction detention time at a lowered reaction temperature increases the amount of the polycarbonate produced, and further facilitates the design of a simplified, inexpensive reactor.

Patent document 4 (EP 0595608B1) discloses a method in which some diaryl carbonates are reacted upon the molecular weight conversion. However, a significant increase of the molecular weight cannot be achieved in this method. Further, patent document 5 (U.S. Pat. No. 5,696,222B) discloses a method for producing a polycarbonate having an increased polymerization degree by adding a certain type of polymerization promoter, for example, an aryl ester compound of carbonic acid or a dicarboxylic acid, such as bis(2-methoxyphenyl) carbonate, bis(2-ethoxyphenyl) carbonate, bis(2-chlorophenyl) carbonate, bis(2-methoxyphenyl) terephthalate, or bis(2-methoxyphenyl) adipate. Patent document 5 teaches that when an ester compound is used as a polymerization promoter, an ester linkage is introduced, so that a polyester-carbonate copolymer (instead of a homopolymer) is formed, and thus the resultant polymer has poor hydrolytic stability.

Patent document 6 (JP Patent No. 4112979) discloses a method in which some bissalicyl carbonates are reacted for obtaining an aromatic polycarbonate having an increased molecular weight.

Patent document 7 (JP 2008-514754A) discloses a method in which, for example, a polycarbonate oligomer and bissalicyl carbonate are introduced into an extruder to effect a polymerization.

Further, patent document 8 (JP Patent No. 4286914) discloses a method in which the terminal hydroxyl group concentration is increased using an active hydrogen compound (dihydroxy compound), and then the resultant aromatic polycarbonate having an increased terminal hydroxyl group concentration is subjected to coupling using a salicylate derivative.

The method disclosed in the above patent document, in which it is necessary to increase the terminal hydroxyl group of a polycarbonate, however, are disadvantageous not only in that a reaction step for an active hydrogen compound and a reaction step for a salicylate derivative are required to cause the production steps to be cumbersome, but also in that the polycarbonate having many hydroxyl group terminals has poor heat stability, leading to a danger of lowering of the physical properties. Further, the increase of the hydroxyl group amount using an active hydrogen compound induces partially a chain cleavage reaction, causing broadening of the molecular weight distribution. Furthermore, for obtaining a satisfactory reaction rate, it is necessary to use a catalyst in a relatively large amount, and, in such a case, a possibility is considered that the physical properties required for the molding become poor.

Several methods for producing a polycarbonate by adding a diol compound to the reaction system have been proposed. For example, patent document 9 (JP H6-94501B) discloses a method for producing a polymeric polycarbonate by introducing 1,4-cyclohexanediol. In the method disclosed in this patent document, however, both 1,4-cyclohexanediol and an aromatic dihydroxy compound are charged into the polycondensation reaction system in advance, and therefore it is presumed that 1,4-cyclohexanediol is first consumed in a reaction for forming polycarbonate (oligomer formation), and then the aromatic dihydroxy compound is reacted to effect a polymerization. For this reason, the method has a disadvantage in that a relatively long reaction time is required, so that the produced polycarbonate is likely to have poor physical properties for external appearance, such as hue.

Patent document 10 (JP 2009-102536A) has a description of a method for producing a polycarbonate, in which a specific aliphatic diol and an ether diol are copolymerized. However, the polycarbonate disclosed in this patent document has an isosorbide skeleton as a main structure, and hence cannot exhibit excellent impact resistance required for the aromatic polycarbonate.

Further, a method in which a cyclic carbonate compound is added to the reaction system (patent document 11; JP Patent No. 3271353) and a method in which a diol having basicity of the hydroxyl group equal to or higher than that of the dihydroxy compound used is added to the reaction system (patent document 12; JP Patent No. 3301453) have been proposed. However, a high molecular-weight polycarbonate resin having satisfactory physical properties cannot be obtained by any of these methods.

As apparent from the foregoing, the conventional methods for producing a high molecular-weight aromatic polycarbonate have many problems to be solved, and there are still demands for an improved method for producing a polycarbonate, which can achieve a polycarbonate having a satisfactorily increased molecular weight while maintaining excellent quality inherent in the polycarbonate.

The present inventors have previously found out a novel process, as a process for obtaining an aromatic polycarbonate which can accomplish a rapid polymerization rate and gives good quality, in which end-capped terminals of the aromatic polycarbonate is connected with an aliphatic diol compound to elongate the chain (Patent Document 13; WO 2011/062220A pamphlet). According to this process, end-capped terminals of the aromatic polycarbonates are linked to the aliphatic diol compound to elongate the chain, whereby an aromatic polycarbonate resin with a high polymerization degree having an Mw of about 30,000 to 100,000 can be produced within a short period of time. This method produces a polycarbonate by a polymerization reaction at a high rate, and therefore can suppress a branching or cross-linking reaction which is caused due to, for example, heat detention for a prolonged time, and can avoid the deterioration of, for example, hue of the resin.

Further, the present inventors have already proposed a method for producing a branched aromatic polycarbonate resin having a desired degree of branching, which comprises the step of subjecting an aromatic polycarbonate prepolymer having a branched structure introduced thereinto and an aliphatic diol compound to transesterification reaction in the presence of a transesterification catalyst under reduced pressure conditions (patent document 14; WO 2012/108510A pamphlet).

By the above methods for obtaining a polycarbonate having an increased molecular weight using a linking agent comprising an aliphatic diol compound, a polycarbonate resin having a satisfactorily increased molecular weight can be produced quickly with ease while maintaining excellent quality inherent in the polycarbonate. However, for producing a high molecular-weight polycarbonate resin having more excellent heat stability, a further improvement of these methods is desired.

PRIOR ART DOCUMENTS

Patent Documents

Patent document 1: JP S50-19600B
Patent document 2: JP H2-153923A
Patent document 3: U.S. Pat. No. 5,521,275B
Patent document 4: EP 0595608B1
Patent document 5: U.S. Pat. No. 5,696,222B
Patent document 6: JP Patent No. 4112979
Patent document 7: JP 2008-514754A
Patent document 8: JP Patent No. 4286914
Patent document 9: JP H6-94501B
Patent document 10: JP 2009-102536A
Patent document 11: JP Patent No. 3271353
Patent document 12: JP Patent No. 3301453
Patent document 13: WO 2011/062220A pamphlet
Patent document 14: WO 2012/108510A pamphlet

DISCLOSURE OF THE INVENTION

Problems to be Solved by the Invention

An object to be solved by the present invention is to provide an improved process for preparing a highly polymerized aromatic polycarbonate resin, which can achieve an aromatic polycarbonate resin having a satisfactorily increased molecular weight while maintaining excellent quality of the aromatic polycarbonate resin.

Means to Solve the Problems

The present inventors have conducted extensive and intensive studies with a view toward solving the above-mentioned problems. As a result, it has been found that, by reacting an aromatic polycarbonate prepolymer and an aliphatic diol compound of a specific structure having hydroxymethyl groups (HO—($CH_2$)—) each bonded to a quaternary carbon atom in the presence of a transesterification catalyst, an aromatic polycarbonate resin having high molecular weight and excellent heat stability can be obtained, and the present invention has been completed.

Specifically, in the present invention, there is provided the below-described improved process for preparing a highly polymerized aromatic polycarbonate resin.

1) A process for preparing a highly polymerized aromatic polycarbonate resin, which comprises a highly polymerizing step for reacting an aromatic polycarbonate prepolymer with an aliphatic diol compound of the following formula (I) having hydroxymethyl groups (HO—$CH_2$—) each bonded to a quaternary carbon atom in the presence of a transesterification catalyst to obtain a highly polymerized aromatic polycarbonate resin:

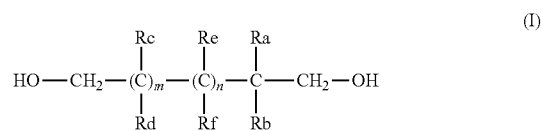

(I)

wherein each of Ra, Rb, Rc, and Rd independently represents a group selected from the group consisting of an aliphatic hydrocarbon group having 1 to 30 carbon atoms and an aryl group having 6 to 30 carbon atoms, each of Re and Rf independently represents a group selected from the group consisting of a hydrogen atom and an aliphatic hydrocarbon group having 1 to 30 carbon atoms, or Ra to Rf are optionally bonded together in an arbitrary combination to form a ring, and each of n and m independently represents an integer of 0 to 10, with the proviso that when n is 1 or more, m is 1 or more.

2) The process according to item 1) above, wherein the aliphatic diol compound of the formula (I) above is a compound of the following formula (III):

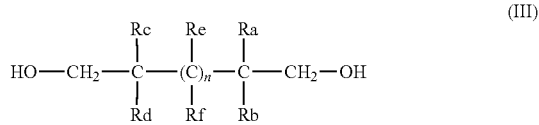

(III)

wherein each of Ra, Rb, Rc, and Rd independently represents a group selected from the group consisting of an aliphatic hydrocarbon group having 1 to 30 carbon atoms and an aryl group having 6 to 30 carbon atoms, each of Re and Rf independently represents a group selected from the group consisting of a hydrogen atom and an aliphatic hydrocarbon group having 1 to 30 carbon atoms, or Ra to Rf are optionally bonded together in an arbitrary combination to form a ring, and n represents an integer of 0 to 10.

3) The process according to item 1) above, wherein the aliphatic diol compound of the formula (I) above is a compound of the following formula (IV):

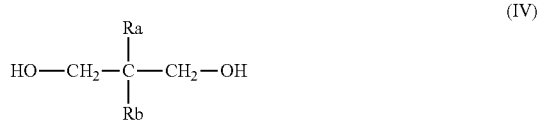

(IV)

wherein each of Ra and Rb independently represents a group selected from the group consisting of an aliphatic hydrocarbon group having 1 to 30 carbon atoms and an aryl group having 6 to 30 carbon atoms, or Ra and Rb are optionally bonded together to form a ring.

4) The process according to item 1) above, wherein the aliphatic diol compound is selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol, 2-methyl-2-propylpropane-1,3-diol, and adamantanedimethanol.

5) The process according to item 1) above, wherein the aliphatic diol compound is adamantanedimethanol.

6) The process according to item 1) above, wherein an amount of the aliphatic diol compound to be used is 0.01 to 1.0 mol based on 1 mol of the total terminal amount of the aromatic polycarbonate prepolymer before subjected to the reaction in the highly polymerizing step.

7) A highly polymerized aromatic polycarbonate resin which is obtained by the process according to item 1) above.

8) The highly polymerized aromatic polycarbonate resin according to item 7) above, wherein an N value (structural viscosity index) represented by the following numerical formula (1) is 1.25 or less.

$$N \text{ value} = (\log(Q160 \text{ value}) - \log(Q10 \text{ value}))/(\log 160 - \log 10) \quad (1)$$

9) The highly polymerized aromatic polycarbonate resin according to item 7) above, wherein a molecular weight (Mw) retaining ratio after the heat detention test (at 360° C. for 60 minutes) is 50% or more.

Effect of the Invention

In the process of the present invention, by reacting an aromatic polycarbonate prepolymer with an aliphatic diol compound having hydroxymethyl groups (HO—CH$_2$—) each bonded to a quaternary carbon atom, there can be obtained a highly polymerized aromatic polycarbonate resin having such excellent heat stability that the resin is unlikely to suffer a thermal decomposition reaction.

Specifically, in the highly polymerized aromatic polycarbonate resin obtained by linking using an aliphatic diol compound having hydroxymethyl groups each bonded to a quaternary carbon atom having no proton, there is no proton present at the 5-position as located by numbering the carbon atoms from the carbonyl oxygen of the carbonate linkage as a starting point, wherein the proton at the 5-position causes a thermal decomposition reaction according to a 1,5-intramolecular hydrogen transfer reaction mechanism. For this reason, even when the skeletal structure comprising the structural unit derived from the aliphatic diol compound (linking agent) remains in the main chain of the obtained highly polymerized aromatic polycarbonate resin, a 1,5-intramolecular hydrogen transfer reaction does not proceed to cause a thermal decomposition, enabling the polycarbonate resin to maintain excellent heat stability.

The thus obtained highly polymerized aromatic polycarbonate resin has physical properties equivalent to those of a polycarbonate produced by a conventional interfacial method. In addition, this polycarbonate resin is highly polymerized at a high reaction rate using an aliphatic diol compound as a linking agent, and therefore not only has quality advantages in that, for example, the degree of branching is small and less heterologous structure is contained, but also is remarkably improved in the heat stability (heat resistance) at high temperatures.

EMBODIMENTS TO CARRY OUT THE INVENTION

In the present specification, the term "step" includes not only the independent step, but also the step which can accomplish the intended purpose even when it cannot be clearly differentiated from the other steps. Also, the numerical range represented by using the term "to" shows the range that includes the numerical values described before and after the term "to" as the minimum value and the maximum value, respectively. Further, an amount of each component in the composition means, when a plural number of the corresponding substances are present in the composition, a total amount of a plural number of the corresponding substances, otherwise specifically mentioned.

The preparation process of the highly polymerized aromatic polycarbonate resin of the present invention is characterized by comprising a highly polymerizing step for reacting an aromatic polycarbonate prepolymer with an aliphatic diol compound having a specific structure in the presence of a transesterification catalyst to obtain a highly polymerized aromatic polycarbonate resin.

(1) Aliphatic Diol Compound

An aliphatic diol compound means a dialcohol compound having two alcoholic hydroxyl groups which each bind to a non-aromatic carbon atom. The aliphatic diol compound includes a compound having aromatic ring moiety in the molecular structure but does not include a phenolic compound having a hydroxyl group binding to an aromatic ring.

The aliphatic diol compound used in the process of the present invention is an aliphatic diol compound of the following formula (I) having hydroxymethyl groups (HO—$CH_2$—) each bonded to a quaternary carbon atom.

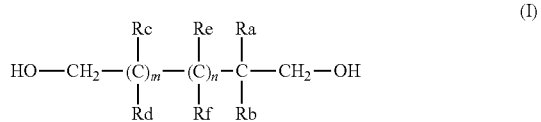

(I)

In the formula (I) above, each of Ra, Rb, Rc, and Rd independently represents a group selected from the group consisting of an aliphatic hydrocarbon group having 1 to 30 carbon atoms and an aryl group having 6 to 30 carbon atoms. Preferred examples of aliphatic hydrocarbon groups having 1 to 30 carbon atoms include an alkyl group having 1 to 10 carbon atoms and a cycloalkyl group having 3 to 20 carbon atoms. More specific examples include a methyl group, an ethyl group, a propyl group, a butyl group, an isobutyl group, an amyl group, and an isoamyl group. Preferred examples of aryl groups having 6 to 30 carbon atoms include an aryl group having 6 to 12 carbon atoms. More specific examples include a phenyl group and a fluorenyl group.

Each of Re and Rf independently represents a group selected from the group consisting of a hydrogen atom and an aliphatic hydrocarbon group having 1 to 30 carbon atoms. Preferred examples of aliphatic hydrocarbon groups having 1 to 30 carbon atoms include an alkyl group having 1 to 10 carbon atoms and a cycloalkyl group having 3 to 30 carbon atoms. More specific examples include a methyl group, an ethyl group, a propyl group, a butyl group, an isobutyl group, an amyl group, and an isoamyl group. Ra to Rf are optionally bonded together in an arbitrary combination to form a ring. Examples of rings include a cycloalkane having 3 to 30 carbon atoms, a bicycloalkane having 6 to 30 carbon atoms, and a tricycloalkane having 6 to 30 carbon atoms. More specific examples include cyclopropane, cyclohexane, bicyclohexane, bicyclooctane, and tricyclodecane (adamantane).

Each of n and m independently represents an integer of 0 to 10, with the proviso that when n is 1 or more, m is 1 or more. Each of n and m is preferably 0 to 5, more preferably an integer of 0 or 1, further preferably 0.

Preferred examples of aliphatic diol compounds of the formula (I) above include compounds of the following formula (III).

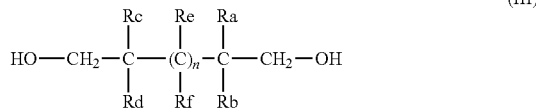

(III)

In the formula (III) above, each of Ra, Rb, Rc, and Rd independently represents a group selected from the group consisting of an aliphatic hydrocarbon group having 1 to 30 carbon atoms and an aryl group having 6 to 30 carbon atoms. Each of Re and Rf independently represents a group selected from the group consisting of a hydrogen atom and an aliphatic hydrocarbon group having 1 to 30 carbon atoms. Ra to Rf are optionally bonded together in an arbitrary combination to form a ring. n represents an integer of 0 to 10. More preferred specific examples of Ra to Rf and n are similar to those mentioned above in the formula (I).

A more preferred aliphatic diol compound of the formula (I) above is a compound of the formula (III) wherein Ra and Rc and/or Rb and Rd are bonded together to form a ring, particularly, a compound of the formula (III) wherein Ra, Rb, Rc, and Rd are bonded together to form a ring, and n, Re, and Rf are respectively the same as those defined in the formula (I) above. Preferred examples and specific examples of the rings are similar to those mentioned above in the formula (I).

More preferred examples of aliphatic diol compounds of the formula (I) above include compounds of the following formula (IV).

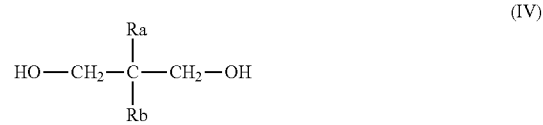

(IV)

In the formula (IV) above, each of Ra and Rb independently represents a group selected from the group consisting of an aliphatic hydrocarbon group having 1 to 30 carbon atoms and an aryl group having 6 to 30 carbon atoms. Ra and Rb are optionally bonded together to form a ring. Preferred examples and specific examples of Ra and Rb are similar to those mentioned above in the formula (I).

Specific examples of the aliphatic diol compounds include compounds selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol, 2-methyl-2-propylpropane-1,3-diol, and adamantanedimethanol. Of these, preferred are 2-butyl-2-ethylpropane-1,3-diol and adamantanedimethanol of the formula below, and especially preferred is adamantanedimethanol.

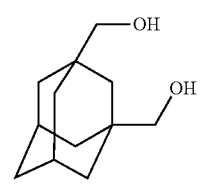 [SMILES: OCC12CC3CC(C1)CC(CO)(C3)C2]

(2) Aromatic Polycarbonate Prepolymer

The aromatic polycarbonate prepolymer (hereinafter, frequently referred to as "aromatic polycarbonate") to be used in the process of the present invention for preparing a highly polymerized aromatic polycarbonate resin is a polycondensed polymer comprising the structure represented by the following formula (II) as a main repeating unit. Here, the term "main" means a content of the structural unit represented by the formula (II) in the whole structural unit of the aromatic polycarbonate prepolymer is 60 mol % or more, preferably 80 mol % or more, more preferably 90 mol % or more.

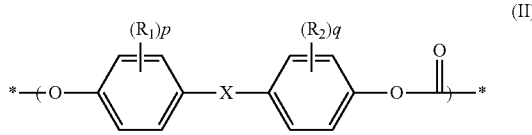

(II)

In the formula (II) above, each of $R_1$ and $R_2$ independently represents a halogen atom, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxy group having 6 to 20 carbon atoms, or an aryloxy group having 6 to 20 carbon atoms. Each of p and q represents an integer of 0 to 4. X represents a single bond or a group selected from the group of divalent organic groups of the following formulae (II').

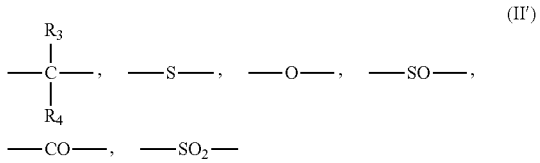

(II')

In the formulae (II') above, each of $R_3$ and $R_4$ independently represents a hydrogen atom, an alkyl group having 1 to 10 carbon atoms, or an aryl group having 6 to 10 carbon atoms, and $R_3$ and $R_4$ are optionally bonded together to form an aliphatic ring.

The process of the present invention comprises a step for highly polymerizing the above-mentioned aromatic polycarbonate prepolymer by subjecting the aromatic polycarbonate prepolymer and an aliphatic diol compound having hydroxymethyl groups (HO—$CH_2$—) each bonded to a quaternary carbon atom to transesterification reaction under a reduced pressure. By this process, there can be obtained an aromatic polycarbonate resin which not only has advantages of the linked highly polymerized polycarbonate in that it has both high molecular weight and high fluidity, while maintaining inherent properties of the aromatic polycarbonate resin, such as an impact resistance, but also has a dramatically improved heat resistance.

Such an aromatic polycarbonate prepolymer can be easily obtained either of the conventionally known transesterification method in which an aromatic dihydroxy compound which derives the structural unit of the formula (II) is reacted with a carbonate diester in the presence of a basic catalyst, or the conventionally known interfacial polycondensation method in which the aromatic dihydroxy compound is reacted with phosgene in the presence of an acid binding agent.

The aromatic dihydroxy compound which derives the structural unit of the formula (II) may be mentioned the compound of the following formula (II").

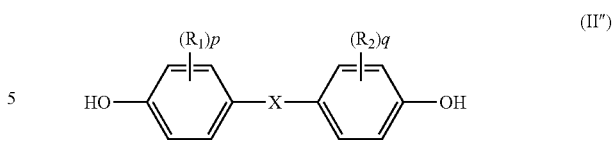

(II")

In the formula (II") above, $R_1$, $R_2$, p, q, and X are respectively the same as those defined in the formula (II) above.

Such an aromatic dihydroxy compound may specifically include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 4,4'-dihydroxydiphenyl ether, 4,4'-dihydroxy-3,3'-dimethyldiphenyl ether, 4,4'-dihydroxydiphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenyl ketone, 4,4'-dihydroxydiphenyl sulfone, 4,4'-dihydroxy-3,3'-dimethyldiphenyl sulfone, etc.

Among these, 2,2-bis(4-hydroxyphenyl)propane, i.e. BPA is mentioned as the preferred one in the points of stability as a monomer, and further a material containing less impurity is easily available, etc.

In the present invention, for the purpose of control of the glass transition temperature, improvement in fluidity, improvement in a refractive index, reduction in double refraction, etc., control of optical properties, etc., a plural kinds of the various monomers, i.e. aromatic dihydroxy compounds may be used in combination.

The aromatic polycarbonate prepolymer to be used in the present invention may be a material synthesized by the interfacial polymerization method or a material synthesized by the melt polymerization method, or may be a material synthesized by the method of the solid phase polymerization method or the thin film polymerization method, etc. It is also possible to use a polycarbonate recovered from used products such as used disk molded product, etc. These polycarbonates may be mixed and utilized as an aromatic polycarbonate prepolymer before the reaction without any problem. For example, the polycarbonate polymerized by the interfacial polymerization method and the polycarbonate polymerized by the melt polymerization method may be mixed, and, the polycarbonate polymerized by the melt polymerization method or the interfacial polymerization method and the polycarbonate recovered from the used disk molded product, etc., may be mixed and used without any problem.

The aromatic polycarbonate prepolymer to be used in the present invention may preferably include a terminal end-capped aromatic polycarbonate prepolymer which satisfies a specific condition(s).

That is, the aromatic polycarbonate prepolymer is preferably at least part of which is end-capped by a terminal group derived from the aromatic monohydroxy compound or a phenyl terminal group which is a phenyloxy group or a phenyloxycarbonyl group (hereinbelow, also referred to "end-capped terminal group" together).

When a ratio of the end-capped terminal group is 60 mol % or more based on the whole terminal amount, the effect is particularly remarkable, and the ratio is preferably 90 mol % or more, more preferably 95 mol % or more. Also, an end-capped terminal group concentration (a ratio of the end-capped terminal group based on the whole constitutional units) is 2 mol % or more, preferably 2 to 20 mol %, particularly preferably 2 to 12 mol %. If the end-capped terminal group concentration is 2 mol % or more, the reaction with the aliphatic diol compound rapidly proceeds, and the effects specific in the present invention are particularly markedly shown. A ratio of the end-capped terminal amount of the aromatic polycarbonate prepolymer based on the whole terminal amount of the polymer can be analyzed by the $^1$H-NMR analysis of the aromatic polycarbonate prepolymer. Also, the end-capped terminal group concentration may be analyzed by a pyrolysis gas chromatography.

Also, the terminal hydroxyl group concentration in the aromatic polycarbonate prepolymer can be measured by spectrometry with a Ti complex or by a $^1$H-NMR analysis. The terminal hydroxyl group concentration means a ratio of a terminal amount of the hydroxyl group based on the whole amount of the constitutional units. The terminal hydroxyl group concentration by the $^1$H-NMR analysis is preferably 1,500 ppm or less, further preferably 1,000 ppm or less is suitable. If the terminal hydroxyl group concentration is within the range or the end-capped terminal group concentration is in the range corresponding to the above, there is a tendency that sufficiently highly polymerizing effects can be obtained by the transesterification reaction with the aliphatic diol compound.

The "whole terminal group amount of the polycarbonate" or "whole terminal group amount of the aromatic polycarbonate prepolymer" herein mentioned is calculated, for example, when there is 0.5 mol of branchless polycarbonate (that is, a linear polymer), the whole terminal group amount is calculated to be 1 mol.

Specific examples of the end-capped terminal group may include terminal groups such as a phenyl terminal, i.e. a phenyloxy group or a phenyloxycarbonyl group, a cresyl terminal, an o-tolyl terminal, a p-tolyl terminal, a p-t-butylphenyl terminal, a biphenyl terminal, an o-methoxycarbonylphenyl terminal, a p-cumylphenyl terminal, etc.

Among these, terminal groups constituted by an aromatic monohydroxy compound having a low boiling point which is easily removed from the reaction system of the transesterification with the aliphatic diol compound are preferred, and a phenyl terminal, a p-tert-butylphenyl terminal, etc., are particularly preferred.

Such an end-capped terminal group can be introduced in the interfacial method by using a terminating agent in preparing the aromatic polycarbonate prepolymer. Specific examples of the terminating agent may include p-tert-butylphenol, phenol, p-cumylphenol, a long chain alkyl-substituted phenol, etc. An amount of the terminating agent to be used can be suitably determined depending on a terminal amount of the desired aromatic polycarbonate prepolymer, that is, the molecular weight of the desired aromatic polycarbonate prepolymer, a reaction apparatus, reaction conditions, etc.

In the melting method, in preparing an aromatic polycarbonate prepolymer, an end-capped terminal group can be introduced by excessively using a carbonate diester such as diphenyl carbonate to an aromatic dihydroxy compound. Whereas it depends on an apparatus to be used for the reaction and reaction conditions, the carbonate diester is specifically used in an amount of 1.00 to 1.30 mol, more preferably 1.02 to 1.20 mol based on 1 mol of the aromatic dihydroxy compound. According to this procedure, an aromatic polycarbonate prepolymer satisfying the end-capped terminal group concentration can be obtained.

In the present invention, as the aromatic polycarbonate prepolymer, a terminal end-capped polycondensation polymer obtained by reacting (i.e. transesterification) the aromatic dihydroxy compound with the carbonate diester is preferably used.

In preparing the aromatic polycarbonate prepolymer, in combination with the aromatic dihydroxy compound, a polyfunctional compound having 3 or more functional groups in the molecule may be used. Such a polyfunctional compound preferably used may include a compound having a reactive functional group such as phenolic hydroxyl group, a carboxyl group, etc.

Further, in preparing the aromatic polycarbonate prepolymer, in combination with the aromatic dihydroxy compound, a dicarboxylic acid compound may be used to prepare a polyester carbonate. The dicarboxylic acid compound may be preferably terephthalic acid, isophthalic acid, naphthalenedicarboxylic acid, 1,4-cyclohexanedicarboxylic acid, etc., and these dicarboxylic acids are preferably employed to use as an acid chloride or an ester compound. Also, in preparing a polyester carbonate resin, the dicarboxylic acid is preferably used in the range of 0.5 to 45 mol %, more preferably in the range of 1 to 40 mol % based on the total of the dihydroxy component (aromatic dihydroxy compound) and the dicarboxylic acid component is made as 100 mol %.

A molecular weight of the aromatic polycarbonate prepolymer is desirably a weight average molecular weight (Mw) of 5,000 to 60,000. It is more preferably an aromatic polycarbonate prepolymer with an Mw in the range of 10,000 to 50,000, further preferably 10,000 to 40,000, particularly preferably 15,000 to 35,000.

If the aromatic polycarbonate prepolymer having a high molecular weight exceeding the above range is used, the aromatic polycarbonate prepolymer itself is high viscosity, so that preparation of the prepolymer is required to be carried out at high temperature, high shearing for a long period of time, and/or the reaction with the aliphatic diol compound may be required to be carried out at high temperature, high shearing for a long period of time.

(3) Preparation of a Highly Polymerized Aromatic Polycarbonate Resin

In the present invention, by reacting the above-mentioned terminal end-capped aromatic polycarbonate prepolymer with an aliphatic diol compound having hydroxymethyl groups (HO—CH$_2$—) each bonded to a quaternary carbon atom in the presence of a transesterification catalyst under reduced pressure conditions, the aromatic polycarbonate prepolymer is highly polymerized. This reaction proceeds at a high reaction rate under mild conditions to achieve a highly polymerized polycarbonate resin. Specifically, after the aliphatic diol compound causes the aromatic polycarbonate prepolymer to suffer a cleavage reaction, a reaction of the aliphatic diol compound and the aromatic polycarbonate prepolymer proceeds faster than a transesterification reaction which forms aliphatic polycarbonate units.

As a result, the aromatic polycarbonate resin in the present invention is obtained, which is a polycarbonate copolymer having structural units derived from the above-mentioned aliphatic diol compound and prepolymer units derived from the aromatic polycarbonate prepolymer.

In the process of the present invention in which the above-mentioned aliphatic diol compound having a specific structure is reacted, as the reaction of the aromatic polycarbonate prepolymer and the aliphatic diol compound proceeds, a cyclic carbonate, which is a cyclic compound having a structure corresponding to the structure of the aliphatic diol compound, may be by-produced. In this case, the removal of the by-produced cyclic carbonate out of the reaction system facilitates highly polymerizing of the aromatic polycarbonate prepolymer, so that an aromatic polycarbonate resin having a structure substantially the same as a conventional homopolycarbonate (for example, a homopolycarbonate resin derived from bisphenol A) is finally obtained.

Specifically, an embodiment of the process of the present invention includes a process comprising a highly polymerizing step for reacting an aromatic polycarbonate and an aliphatic diol compound in the presence of a transesterification catalyst to obtain a highly polymerized aromatic polycarbonate resin, and a cyclic carbonate removal step for removing at least part of the cyclic carbonate by-produced in the above highly polymerizing reaction out of the reaction system.

The highly polymerizing step and the cyclic carbonate removal step need not be physically and temporally separate steps, and are carried out simultaneously in practice. The preferred preparation process of the present invention includes a step in which the aromatic polycarbonate and the aliphatic diol compound are reacted in the presence of a transesterification catalyst to make higher polymerization as well as removing at least part of the by-produced cyclic carbonate produced in the highly polymerizing reaction out of the reaction system.

In the process having the step for removing the by-produced cyclic carbonate out of the reaction system, as preferred examples of structures of the aliphatic diol compound used, there can be mentioned aliphatic diol compounds of the formula (IV) below. In the formula (IV), Ra and Rb are respectively the same as those defined in the formula (I) above. More preferably, each of Ra and Rb independently represents a linear or branched alkyl group having 1 to 5 carbon atoms, further preferably a linear or branched alkyl group having 1 to 4 carbon atoms. Especially preferred specific examples include a methyl group, an ethyl group, a propyl group, a butyl group, and an isobutyl group.

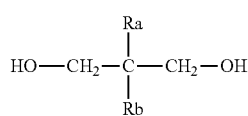

(IV)

The by-produced cyclic carbonate is a cyclic compound having a structure corresponding to the above-mentioned aliphatic dial compound, preferably a compound having a structure of the formula (h3) below. In the formula (h3), Ra and Rb are respectively the same as those defined in the formula (IV) above.

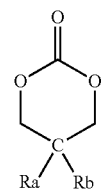

(h3)

Specific examples of the cyclic carbonates include compounds having structures shown below.

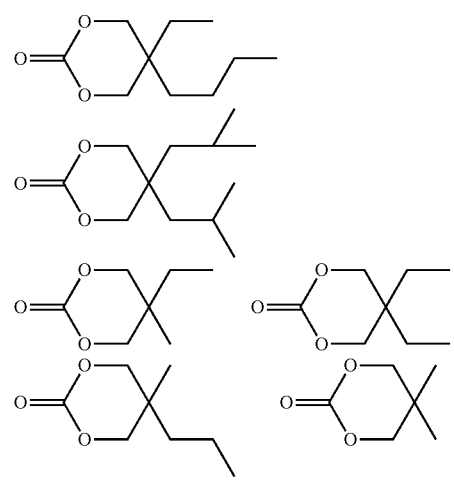

The process of the present invention has the merit that it can be highly polymerized with a high speed as compared with the preparation process of the polycarbonate by the conventional melting method. This is the common merit as the high molecular weight polycarbonate resin obtained by the linking higher polymerization method using the other aliphatic diol compounds as the linking agent found out by the present inventors.

On the other hand, in the process of the present invention, with respect to an aliphatic diol compound, by using an aliphatic diol compound having hydroxymethyl groups each bonded to a quaternary carbon atom, there can be obtained a polycarbonate resin having such excellent heat stability that the resin is unlikely to suffer a thermal decomposition reaction. That is, it is likely that the polycarbonate resin obtained by the present invention has improved heat stability, as compared to a high molecular-weight polycarbonate resin obtained by linking using an aliphatic diol compound having a hydroxymethyl group bonded to, for example, a tertiary, secondary, or primary carbon atom having one or more protons.

An aliphatic diol compound having a hydroxymethyl group bonded to a tertiary, secondary, or primary carbon atom having one or more protons may suffer an intramolecular hydrogen transfer reaction to cause a thermal decomposition, generating endo-olefins. In the highly polymerized aromatic polycarbonate resin obtained by linking using such an aliphatic diol compound having a hydroxymethyl group bonded to a tertiary, secondary, or primary carbon atom, there is a proton present at the 5-position as located by numbering the carbon atoms from the carbonyl oxygen of the carbonate linkage as a starting point, and therefore a 1,5-intramolecular hydrogen transfer reaction is likely to proceed to cause a thermal decomposition, leading to the deterioration of the heat stability. Complete elucidation of the mechanism of the thermal decomposition reaction due to a 1,5-intramolecular hydrogen transfer reaction has not yet been made. However, a scheme of the conceivable mechanism is shown below, taking as an example the case of a polycarbonate resin using 9,9-bis[4-(2-hydroxyethoxy)phenyl]fluorene (abbreviated to "BPEF") as a linking agent.

Further, in the case where the aliphatic diol compound in the present invention having a structure represented by the formula (IV) above is used and a cyclic carbonate having a specific structure is by-produced, after the by-produced cyclic carbonate is removed out of the reaction system, there is obtained a highly polymerized aromatic polycarbonate resin which is substantially a homopolymer comprising the same structural unit as that of the aromatic polycarbonate

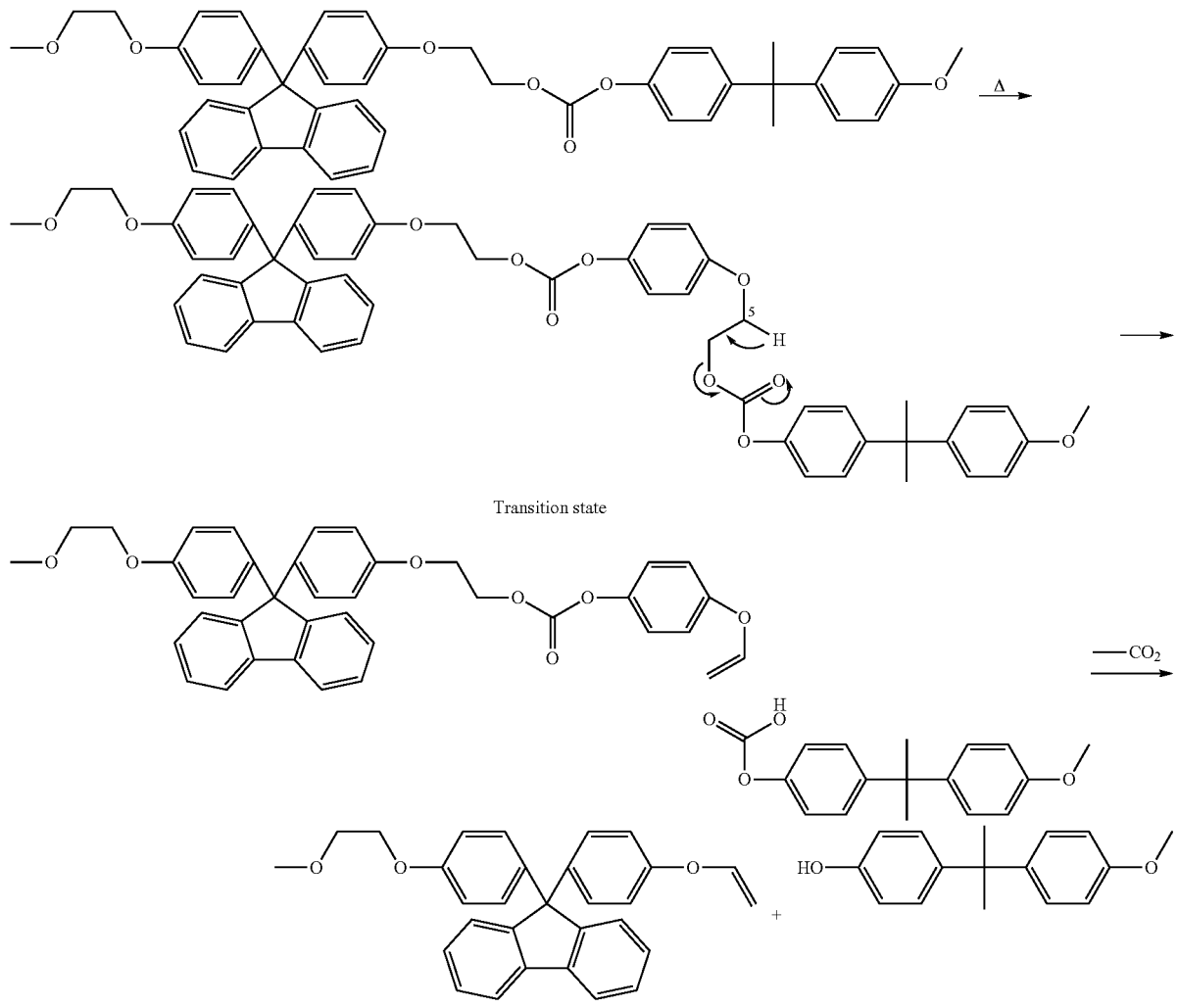

Transition state

The highly polymerized aromatic polycarbonate resin obtained by the process of the present invention is produced by linking using an aliphatic diol compound having hydroxymethyl groups each bonded to a quaternary carbon atom having no proton. Therefore, in the obtained highly polymerized aromatic polycarbonate resin, there is no proton present at the 5-position as located by numbering the carbon atoms from the carbonyl oxygen of the carbonate linkage as a starting point. For this reason, even when the skeletal structure comprising the structural unit derived from the aliphatic diol compound (linking agent) remains in the main chain of the obtained highly polymerized aromatic polycarbonate resin, a 1,5-intramolecular hydrogen transfer reaction does not proceed to cause a thermal decomposition, enabling the polycarbonate resin to maintain excellent heat stability.

prepolymer as a main repeating unit. The by-produced cyclic carbonate has the structure corresponding to the aliphatic diol compound to be used, and is considered to be a cyclic material derived from the aliphatic diol compound.

The highly polymerized aromatic polycarbonate resin obtained by the preparation process of the present invention using the aliphatic diol compound having the structure represented by the formula (IV) does not substantially contain the structural unit derived from the aliphatic diol compound, and the skeletal structure of the resin is substantially the same as that of the homopolycarbonate resin which comprises the same structural unit as that of the aromatic polycarbonate prepolymer as a repeating unit. That is, since the structural unit derived from the aliphatic diol compound which is the linking agent is not contained in the skeletal structure or even if it is contained, the amount is extremely little, the resulting resin has extremely high thermal stability and excellent heat resistance. On the other hand, it can possess excellent qualities, while having the same skeletal structure as that of the conventional homopolycarbonate resin, such as a low N value, less ratio of the unit having a heterologous structure, and excellent in color tone, etc.

(3) Preparation Process

Hereinbelow, detailed conditions of the preparation process of the present invention are explained.

(i) Addition of Aliphatic Diol Compound

In the preparation process of the present invention, to the aromatic polycarbonate prepolymer is added the aliphatic diol compound and mixed, and highly polymerizing reaction (transesterification) is carried out in a highly polymerizing reactor.

An amount of the aliphatic diol compound to be used is preferably 0.01 to 1.0 mol based on 1 mol of the whole terminal group amount of the aromatic polycarbonate prepolymer, more preferably 0.1 to 1.0 mol, further preferably 0.2 to 0.7 mol. However, when a material having a relatively low boiling point (for example, a boiling point of less than about 350° C.) is used as the aliphatic diol compound, such a material may be added with an excessive amount in consideration with the possibility that a part of which is passed through the reaction system without participating in the reaction by volatilization, etc., depending on the reaction conditions. For example, it may be added with the maximum amount of 50 mol, preferably 10 mol, more preferably 5 mol based on 1 mol of the whole terminal group amount of the aromatic polycarbonate prepolymer.

A method of adding and mixing the aliphatic diol compound is not particularly limited, and when a material having a relatively high boiling point (boiling point: about 350° C. or higher) is used as the aliphatic diol compound, the aliphatic diol compound is preferably directly supplied to a highly polymerizing reactor under higher vacuum conditions with a pressure reduction degree of 10 torr (1333 Pa or lower) or lower. It is more preferably a pressure reduction degree of 2.0 torr or lower (267 Pa or lower), more preferably 0.01 to 1.0 torr (1.3 to 133 Pa or lower). If the pressure reduction degree at the time of supplying the aliphatic diol compound to the highly polymerizing reactor is insufficient, a cleavage reaction of the prepolymer main chain due to the by-product (for example, phenol) proceeds, and there is a case where the reaction time of the reaction mixture cannot help making longer for higher polymerization.

On the other hand, when a material having a relatively low boiling point (boiling point: less than about 350° C.) is used as the aliphatic diol compound, the aromatic polycarbonate prepolymer and the aliphatic diol compound can be mixed under a relatively gentle pressure reduction degree. For example, the aromatic polycarbonate prepolymer and the aliphatic diol compound are mixed at a pressure near to the normal pressure to prepare a prepolymer mixture, then, the prepolymer mixture is subjected to a highly polymerizing reaction under reduced pressure conditions, so that even when it is an aliphatic diol compound having a relatively low boiling point, volatilization can be restrained at the minimum degree and it is not necessary to use the compound excessively.

(ii) Transesterification Reaction (Highly Polymerizing Reaction)

A temperature to be used for transesterification reaction (highly polymerizing reaction) of the aromatic polycarbonate prepolymer and the aliphatic diol compound is preferably in the range of 240° C. to 320° C., more preferably 260° C. to 310° C., further preferably 280° C. to 310° C.

Also, the pressure reduction degree is preferably 13 kPa (100 torr) or lower, more preferably 1.3 kPa (10 torr) or lower, further preferably 0.013 to 0.67 kPa (0.1 to 5 torr).

Examples of the transesterification catalyst to be used in the present transesterification reaction may include a basic compound catalyst. Particularly, examples of the basic compound catalyst may include an alkali metal compound, an alkaline earth metal compound, a nitrogen-containing compound, etc.

Such a compound preferably used may include an organic acid salt, an inorganic salt, an oxide, a hydroxide, a hydride or an alkoxide of an alkali metal and alkaline earth metal, etc.; a quaternary ammonium hydroxide and a salt thereof; and amines, etc., and these compounds may be used alone or two or more in combination.

Specific examples of the alkali metal compound used may include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium tetraphenylborate, sodium benzoate, potassium benzoate, cesium benzoate, lithium benzoate, disodium hydrogen phosphate, dipotassium hydrogen phosphate, dilithium hydrogen phosphate, disodium phenylphosphate, sodium gluconate, disodium salt, dipotassium salt, dicesium salt or dilithium salt of bisphenol A, sodium salt, potassium salt, cesium salt or lithium salt of phenol, etc. Among these, the alkali metal compound is preferably sodium hydrogen carbonate, sodium carbonate, potassium carbonate, cesium carbonate, etc.

The alkaline earth metal compound specifically used may include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenylphosphate, etc.

Specific examples of the nitrogen-containing compound to be used may include quaternary ammonium hydroxides having an alkyl group and/or an aryl group such as tetramethylammonium hydroxide, tetraethylammonium hydroxide, tetrapropylammonium hydroxide, tetrabutylammonium hydroxide, trimethylbenzylammonium hydroxide, etc., tertiary amines such as triethylamine, dimethylbenzylamine, triphenylamine, etc., secondary amines such as diethylamine, dibutylamine, etc., primary amines such as propylamine, butylamine, etc., imidazoles such as 2-methylimidazole, 2-phenylimidazole, benzoimidazole, etc., or bases or basic salts such as ammonia, tetramethylammonium borohydride, tetrabutylammonium borohydride, tetrabutylammonium tetraphenylborate, tetraphenylammonium tetraphenylborate, etc. Among these, the nitrogen-containing compound is preferably tetramethylammonium hydroxide, etc.

The transesterification catalyst also preferably used is a salt of zinc, tin, zirconium, or lead, and these may be used singly or in combination of two or more.

Specific examples of the transesterification catalyst may include zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonate, zirconium oxyacetate, zirconium tetrabutoxide, lead(II) acetate, lead(IV) acetate, etc.

These transesterification catalysts are used with a ratio of $1 \times 10^{-9}$ to $1 \times 10^{-3}$ mol, preferably a ratio of $1 \times 10^{-7}$ to $1 \times 10^{-5}$ mol based on 1 mol of the total aromatic dihydroxy compound.

(iii) Cyclic Carbonate Removal Step

In the process of the present invention, which has the step for removing the cyclic carbonate by-produced in the highly polymerizing reaction out of the reaction system, the removal of the by-produced cyclic carbonate out of the reaction system facilitates a highly polymerizing reaction of the aromatic polycarbonate prepolymer.

As an example of the method of removing the cyclic carbonate, there can be mentioned a method in which the cyclic carbonate is distilled off the reaction system in the form of a distillate, together with, for example, the by-produced aromatic monohydroxy compound, such as phenol, and the unreacted aliphatic diol compound, which are contained in the distillate. The temperature for distilling the compounds off the reaction system is, for example, 240 to 320° C., preferably 260 to 310° C., more preferably 280 to 310° C.

With respect to the removal of the cyclic carbonate, at least part of the by-produced cyclic carbonate is removed. It is most preferred that all of the by-produced cyclic carbonate is removed. However, generally, it is difficult to completely remove the by-produced cyclic carbonate. In the case that the by-produced cyclic carbonate cannot be completely removed, it is acceptable for the resultant product of a highly polymerized aromatic polycarbonate resin to contain the remaining cyclic carbonate. A preferred upper limit of the amount of the cyclic carbonate remaining in the product is 3,000 ppm.

The cyclic carbonate distilled off the reaction system can be thereafter recovered through, for example, hydrolysis and purification steps, and reused (recycled). The phenol distilled off together with the cyclic carbonate can be similarly recovered, and reused to the production process for diphenyl carbonate.

(iv) Other Preparation Conditions

In the present invention, according to the transesterification reaction of the aromatic polycarbonate prepolymer and the aliphatic diol compound, it is preferred to heighten the weight average molecular weight (Mw) of the aromatic polycarbonate resin after the reaction 5,000 or more than the weight average molecular weight (Mw) of the aromatic polycarbonate prepolymer, more preferably to heighten 10,000 or more, further preferably 15,000 or more.

A kind of the apparatus or a material of the reaction vessel to be used for the transesterification reaction with the aliphatic diol compound may be used any conventionally known material, and the reaction may be carried out either by the continuous system or the batch system. The reaction apparatus to be used for carrying out the reaction may be a vertical type equipped with an anchor stirring blade, Maxblend® type stirring blade, helical ribbon type stirring blade, etc., a horizontal type equipped with a paddle blade, lattice blade, spectacle-shaped blade, etc., or an extruder type equipped with a screw. In addition, a reaction apparatus in which the above are suitably used in combination in view of the viscosity of the polymerized material is used and preferably practiced. It is preferred to use an apparatus having a blade which has good horizontal type stirring efficiency, and having a unit which can make the apparatus reduced pressure conditions.

Further preferably, a twin-screw extruder or a horizontal type reactor having a polymer seal and having a devolatilization structure is suitable.

As the material of the apparatus, a material which does not affect to the color tone of polymer including a stainless steel such as SUS310, SUS316, SUS304, etc., nickel, nitrided steel, etc., is preferred. Also, to the inside (the portion contacting with the polymer) of the apparatus, buffing or electrolytic polishing may be applied, or a metal (such as chromium, etc.) plating treatment may be carried out.

In the present invention, to the aromatic polycarbonate resin heightened in the molecular weight may be used a deactivator of the catalyst. In general, a method of deactivating the catalyst by adding a conventionally known acidic substance is suitably carried out. These substances may specifically include aromatic sulfonic acids such as para-toluenesulfonic acid, etc.; aromatic sulfonic acid esters such as butyl paratoluenesulfonate, etc.; aromatic sulfonic acid salts such as tetrabutylphosphonium dodecylbenzenesulfonate, tetrabutylammonium paratoluenesulfonate, etc.; organic halides such as stearic acid chloride, butyric acid chloride, benzoyl chloride, toluenesulfonic acid chloride, benzyl chloride, etc.; alkyl sulfates such as dimethyl sulfate, etc.; phosphoric acids; phosphorous acids, etc.

Among these, the catalyst deactivator selected from the group consisting of paratoluenesulfonic acid, butyl paratoluenesulfonate, tetrabutylphosphonium dodecylbenzenesulfonate, and tetrabutylammonium paratoluenesulfonate can be suitably used.

Addition of the catalyst deactivator can be carried out to the polycarbonate resin by the conventionally known method after completion of the highly polymerizing reaction. For example, a method in which, after dispersing and mixing by a high speed mixer represented by a tumbling mixer, a Henschel mixer, a ribbon blender or a super mixer, the mixture is melted and kneaded by an extruder, a Banbury mixer, a roller, etc., can be suitably selected.

After deactivating the catalyst, a step of devolatilizing and removing a low boiling point compound in the polymer under a pressure of 0.013 to 0.13 kPaA (0.1 to 1 torr), at a temperature of 200 to 350° C. may be provided. For the above procedure, a horizontal type apparatus equipped with a stirring blade excellent in surface renewal ability such as a paddle blade, lattice blade, spectacle-shaped blade, etc., or a thin film evaporator is suitably used.

Preferably, a twin-screw extruder or a horizontal type reactor having a polymer seal and having a vent structure is suitable.

Further, in the present invention, a heat resistant stabilizer, a hydrolysis stabilizer, an antioxidant, a pigment, a dye, a reinforcing agent or a filler, a UV absorber, a lubricant, a mold-releasing agent, a nucleating agent, a plasticizer, a fluidity improver, an antistatic agent, etc., may be added.

The heat resistant stabilizer may be used those conventionally known such as triphenylphosphine (P-Ph$_3$), etc.

Examples of the antioxidant may include tris-(2,4-di-t-butylphenyl)phosphite, n-octadecyl-β-(4'-hydroxy-3',5'-di-t-butylphenyl)propionate, pentaerythrityl-tetrakis[3-(3,5-di-t-butyl-4-hydroxyphenyl)propionate], n-octadecyl-β-(4'-hydroxy-3',5'-di-t-butylphenyl)propionate, 1,6-hexanediol bis[3-(3,5-di-t-butyl-4-hydroxyphenyl)propionate], triethylene glycol-bis-3-(3-t-butyl-4-hydroxy-5-methylphenylpropionate), 3,9-bis[2-{3-(3-t-butyl-4-hydroxy-5-methylphenyl)propionyloxy}-1,1-dimethylethyl]-2,4,8,10-tetraoxaspiro[5.5]undecane, triphenyl phosphite, trisnonylphenyl phosphite, tris-(2,4-di-t-butylphenyl)phosphite, tetrakis(2,4-di-t-butylphenyl)-4,4'-biphenylene diphosphonite, tricresyl phosphite, 2,2-methylenebis(4,6-di-t-butylphenyl)octyl phosphite, etc. Among these, preferred are tris-(2,4-di-t-butylphenyl)phosphite of the following formula A, and n-octadecyl-β-(4'-hydroxy-3',5'-di-t-butylphenyl)propionate of the following formula B.

(Formula A)

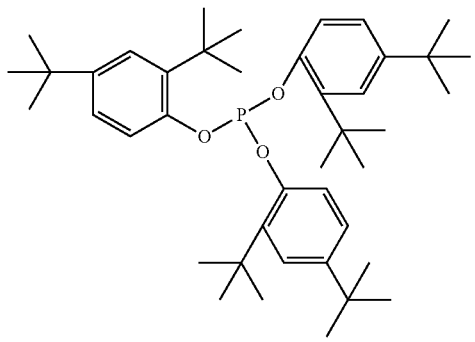

(Formula B)

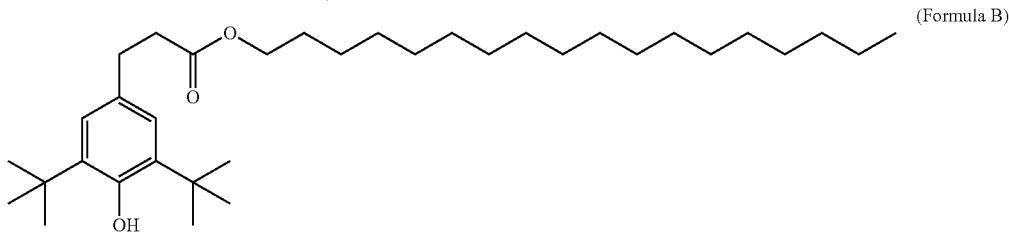

These additives can be mixed with the polycarbonate resin in the same manner as the catalyst deactivator, by the conventionally known method. For example, a method in which each component is dispersed and mixed with a high speed mixer represented by a tumbling mixer, a Henschel mixer, a ribbon blender and a super mixer, and then, melting and kneading by an extruder, a Banbury mixer, a roller, etc., can be suitably selected. The addition step of the additive(s) may be simultaneously with the catalyst deactivator or different from the same.

(4) Highly Polymerized Aromatic Polycarbonate Resin

The weight average molecular weight (Mw) of the highly polymerized aromatic polycarbonate resin prepared by the preparation process of the present invention is 30,000 to 100,000, preferably 30,000 to 80,000, more preferably 35,000 to 75,000, and whereas the resin has a high molecular weight, it also has high fluidity. According to this constitution, in a case that it is used for the uses such as blow molding, extrusion molding, etc., a satisfactory melt tension is achieved, and thus a molding material excellent in moldability can be obtained.

When the aromatic polycarbonate resin having a weight average molecular weight in the above-mentioned range is used in the application of, for example, injection molding, stringing and the like are suppressed in the molding, so that a satisfactory shaped article is obtained. Further, the obtained shaped article has excellent physical properties, such as mechanical properties and a heat resistance. In addition, the shaped article has a reduced oligomer region and hence is improved in physical properties, such as an organic solvent resistance. When the aromatic polycarbonate resin has too high a weight average molecular weight, it is difficult to subject the resin to injection molding for forming a precision part or a thin part, and the molding cycle time is prolonged, adversely affecting the production cost. In such a case, for solving the problem, for example, an increase of the molding temperature is needed, but the resin under high temperature conditions possibly suffers, for example, gelation, the occurrence of a heterologous structure, or an increase of the N value.

Also, in the highly polymerized aromatic polycarbonate resin of the present invention, an N value (structural viscosity index) represented by the following numerical formula (1) is preferably 1.3 or less, more preferably 1.28 or less, especially preferably 1.25 or less.

$$N \text{ value}=(\log(Q160 \text{ value})-\log(Q10 \text{ value}))/(\log 160-\log 10) \quad (1)$$

In the numerical formula (1), Q160 value represents a melt flow volume (ml/sec) per a unit time measured at 280° C. and a load of 160 kg (measured by using Type CFT-500D manufactured by Shimadzu Corporation (hereinafter the same), calculated from stroke=7.0 to 10.0 mm), and Q10 value represents a melt flow volume (ml/sec) per a unit time measured at 280° C. and a load of 10 kg (calculated from stroke=7.0 to 10.0 mm). Here, nozzle diameter: 1 mm×nozzle length: 10 mm.

A structural viscosity index "N value" is used as an index of a branching degree of the aromatic polycarbonate resin. The N value in the highly polymerized aromatic polycarbonate resin of the present invention is low, and a contained ratio of the branched structure is little and a ratio of the linear structure is high. Fluidity of a polycarbonate resin generally tends to become high (Q value becomes high) when a ratio of the branched structure is made larger at the same Mw, but the highly polymerized aromatic polycarbonate resin of the present invention accomplishes high fluidity (high Q value) while maintaining the N value to a low value.

Also, the highly polymerized aromatic polycarbonate resin obtained by the preparation process of the present invention has good hue.

Evaluation of the hue of the aromatic polycarbonate resin is generally represented by a YI value. In general, the YI value of an aromatic polycarbonate resin obtained by the interfacial polymerization method shows 0.8 to 1.0. On the other hand, a high molecular weight product of the aromatic polycarbonate obtained by the melt polymerization method shows the YI value of 1.7 to 2.0 due to lowering in quality accompanied by the preparation step. However, the YI value of the highly polymerized aromatic polycarbonate resin obtainable by the preparation process according to the present invention shows the equivalent YI value to the aromatic polycarbonate obtained by the interfacial polymerization method, and worsening in hue is not observed.

Also, by using starting materials having higher purities, a color tone or a molecular weight retaining ratio (an index showing how lowering in a molecular weight can be suppressed when heat detention is applied under high temperatures) can be further improved.

Specifically, a molecular weight (Mw) retaining ratio after the heat detention test (at 360° C. for 60 minutes) of the highly polymerized aromatic polycarbonate resin obtained by the preparation process of the present invention can be made 50% or more, more preferably 70% or more.

(5) Aromatic Polycarbonate Resin Composition

The polycarbonate resin composition in the present invention comprises as a main component the highly polymerized aromatic polycarbonate resin obtained by the above-mentioned process of the present invention.

The highly polymerized aromatic polycarbonate resin obtained by the process of the present invention may contain a small amount of a cyclic polycarbonate remaining after the cyclic carbonate by-produced in the step for preparation is removed. Therefore, the aromatic polycarbonate resin composition in the present invention may contain the cyclic carbonate of the formula (h3) above. The content of the cyclic carbonate in the aromatic polycarbonate resin composition in the present invention is preferably 3,000 ppm or less, more preferably 1,000 ppm or less, further preferably 500 ppm or less, especially preferably 300 ppm or less. With respect to the lower limit of the cyclic polycarbonate content, there is no particular limitation. The lower limit of the cyclic carbonate content is ideally 0%, and generally becomes the detection limit, but is preferably 0.0005 ppm or more. When the cyclic carbonate content falls in the above-mentioned range, it is possible to suppress, for example, a lowering of the strength of the resin.

Further, the highly polymerized aromatic polycarbonate resin obtained by the process of the present invention may contain the catalyst deactivator used in the step for preparation. Therefore, the polycarbonate resin composition in the present invention may contain the catalyst deactivator. The catalyst deactivator contained may further improve the resin composition in heat stability.

With respect to the content of the catalyst deactivator in the aromatic polycarbonate resin composition in the present invention, there is no particular limitation, but the catalyst deactivator content is preferably 3 ppm or more, more preferably 5 ppm or more. When the catalyst deactivator content is 3 ppm or more, the effect of improving the resin composition in heat stability becomes remarkable. With respect to the upper limit of the catalyst deactivator content, there is no particular limitation, but the upper limit is preferably 30 ppm or less, more preferably 20 ppm or less.

Specific examples of catalyst deactivators for improving the heat stability include aromatic sulfonic acids such as paratoluenesulfonic acid; aromatic sulfonic acid esters such as butyl paratoluenesulfonate; aromatic sulfonic acid salts such as tetrabutylphosphonium dodecylbenzenesulfonate, tetrabutylammonium paratoluenesulfonate; organic halides such as stearic acid chloride, butyric acid chloride, benzoyl chloride, toluenesulfonic acid chloride, benzyl chloride; alkyl sulfates such as dimethyl sulfate; phosphoric acids; phosphorous acids, etc.

Among these, the catalyst deactivator selected from the group consisting of paratoluenesulfonic acid, butyl paratoluenesulfonate, tetrabutylphosphonium dodecylbenzenesulfonate, and tetrabutylammonium paratoluenesulfonate can be suitably used.

In the aromatic polycarbonate resin composition in the present invention, further, a heat resistant stabilizer, a hydrolysis stabilizer, an antioxidant, a pigment, a dye, a reinforcing agent or a filler, a UV absorber, a lubricant, a mold-releasing agent, a nucleating agent, a plasticizer, a fluidity improver, an antistatic agent, etc., may be added.

The heat resistant stabilizer may be used those conventionally known such as triphenylphosphine (P-Ph$_3$), etc.

Examples of the antioxidant may include tris-(2,4-di-t-butylphenyl)phosphite, n-octadecyl-β-(4'-hydroxy-3',5'-di-t-butylphenyl)propionate, pentaerythrityl-tetrakis[3-(3,5-di-t-butyl-4-hydroxyphenyl)propionate], n-octadecyl-β-(4'-hydroxy-3',5'-di-t-butylphenyl)propionate, 1,6-hexanediol bis[3-(3,5-di-t-butyl-4-hydroxyphenyl)propionate], triethylene glycol-bis-3-(3-t-butyl-4-hydroxy-5-methylphenylpropionate), 3,9-bis[2-{3-(3-t-butyl-4-hydroxy-5-methylphenyl)propionyloxy}-1,1-dimethylethyl]-2,4,8,10-tetraoxaspiro[5.5]undecane, triphenyl phosphite, trisnonylphenyl phosphite, tris-(2,4-di-t-butylphenyl)phosphite, tetrakis(2,4-di-t-butylphenyl)-4,4'-biphenylene diphosphonite, tricresyl phosphite, 2,2-methylenebis(4,6-di-t-butylphenyl)octyl phosphite, etc. Among these, preferred are tris-(2,4-di-t-butylphenyl)phosphite and n-octadecyl-β-(4'-hydroxy-3',5'-di-t-butylphenyl)propionate.

(6) Shaped Article

The highly polymerized aromatic polycarbonate resin obtained by the process of the present invention and the aromatic polycarbonate resin composition can be preferably used in applications of, for example, various shaped articles, sheets, and films obtained by, for example, injection molding, blow molding (hollow molding), extrusion, injection blow molding, rotary molding, or compression molding. When used in these applications, the resin of the present invention may be used either in a single form or in the form of a mixture blended with other polymers. According to the application, the resin of the present invention can be preferably subjected to processing, such as hard coating or lamination.

The highly polymerized aromatic polycarbonate resin obtained by the process of the present invention and the polycarbonate resin composition are especially preferably used in, for example, extrusion, blow molding, and injection molding. As examples of shaped articles obtained from the resin, there can be mentioned an extruded article, a blow molded article, and an injection molded article, such as a precision part or a thin part. An injection molded article, such as a precision part or a thin part, preferably has a thickness of 1 μm to 3 mm.

Specific examples of shaped articles include optical media, such as a compact disc, a digital video disc, a minidisc, and a photomagnetic disc; optical communication media, such as an optical fiber; optical parts, such as a headlamp lens for an automobile and others, and a lens for a camera and others; optical device parts, such as a siren light cover and a lighting lamp cover; a car window glass substitute for, for example, an electric railcar and an automobile; a home window glass substitute; natural lighting parts, such as a sunroof and a greenhouse roof; a lens and a housing for goggles, sunglasses, and spectacles; a housing for office automation machines, such as a copying machine, a facsimile machine, and a personal computer; a housing for household electrical appliances, such as a television and a microwave oven; electronic part uses, such as a connector and an IC tray; protective tools, such as a helmet, a protector, and a protective mask; household products, such as a feeding bottle, tableware, and a tray; medical products, such as a case for artificial dialysis and a false tooth; packaging materials; and miscellaneous goods, such as a writing tool and stationery, but the shaped article is not limited to these.

As especially preferred examples of the applications of the highly polymerized aromatic polycarbonate resin obtained by the process of the present invention and the polycarbonate resin composition, there can be mentioned the shaped articles shown below which require high strength and precision moldability.

Automobile members, such as a headlamp lens, a meter board, a sunroof, a glass window substitute, and an outer ply part.

Various films for liquid crystal display and others, a light guide plate, and an optical disc substrate.

Constructional materials, such as a transparent sheet.

Structural members, such as a housing for a personal computer, printer, or liquid crystal television.

EXAMPLES

Hereinbelow, the present invention is explained by referring to Examples, but the present invention is not limited by these Examples. Here, the measured values in Examples were measured by using the following methods or apparatuses.

1) Weight Average Molecular Weight (Mw) Calculated on Polystyrene:

By using GPC, and chloroform as an eluent, a calibration curve was prepared by using standard polystyrenes manufactured by TOSOH CORPORATION, "PStQuick MP-M", molecular weights (molecular weight distribution=1) of which have been known. From the measured standard polystyrenes, elution times of each peak and molecular weight values were plotted, and approximation by a cubic equation was carried out to prepare a calibration curve. The weight average molecular weight (Mw) was obtained from the following calculation formula.

$$Mw = \Sigma(W_i \times M_i) \div \Sigma(W_i)$$ [Calculation formula]

Here, i represents an $i^{th}$ separation point when the molecular weight M is divided, $W_i$ represents a weight at the $i^{th}$, and $M_i$ represents a molecular weight at the $i^{th}$. Also, the molecular weight M represents a polystyrene molecular weight value at the same elution time of the calibration curve.

[Measurement Conditions]

Apparatus; HLC-8320GPC, manufactured by TOSOH CORPORATION

Column; Guard column: TSKguardcolumn SuperMPHZ-M×1

Analysis column: TSKgel SuperMultiporeHZ-M×3

Solvent; HPLC grade chloroform

Injected amount; 10 μL

Sample concentration; 0.2 w/v % HPLC grade chloroform solution

Solvent flow rate; 0.35 ml/min

Measurement temperature; 40° C.

Detector; RI

2) Terminal hydroxyl group concentration (ppm): A complex formed by the polymer and titanium tetrachloride in a methylene chloride solution was measured by UV/visible spectroscopy (546 nm). Or, it was measured by observing the terminal hydroxyl group from the analytical result of $^1$H-NMR.

A terminal hydroxyl group concentration in the prepolymer (PP) by $^1$H-NMR measurement was obtained by dissolving 0.05 g of the resin sample in 1 ml of deuterium-substituted chloroform containing 0.05 w/v % TMS, and measuring $^1$H-NMR at 23° C. Specifically, the terminal hydroxyl group concentration (OH concentration) in the PP was calculated from the integration ratio of the hydroxyl group peak at 4.7 ppm and the phenyl and phenylene groups (terminal phenyl group and phenylene group derived from BPA skeletal structure) at around 7.0 to 7.5 ppm.

Here, details of the measurement conditions of $^1$H-NMR are as follows. Apparatus: LA-500 (500 MHz) manufactured by JEOL Ltd.

Measured nucleus: $^1$H

Relaxation delay: 1s x_angle: 45 deg x_90_width: 20 μs x_plus: 10 μs

Scan: 500 times

3) Terminal phenyl group concentration (end-capped terminal group concentration, Ph terminal concentration; mol %): From the analytical results of the $^1$H-NMR, it was obtained by the following mentioned numerical formula.

$$\text{Ph terminal amount (mol \%)} = \frac{(H \text{ areal ratio of terminal -Ph-}/2)}{(H \text{ areal ratio of terminal -Ph-}/2 + H \text{ areal ratio of -Ph-}/8)} \times 100$$

Specifically, 0.05 g of a resin sample was dissolved in 1 ml of deuterium-substituted chloroform (containing 0.05 w/v % TMS), $^1$H-NMR spectrum thereof was measured at 23° C., and a terminal phenyl group amount and terminal phenyl group concentration of the PP were measured from the integration ratio of the terminal phenyl group at around 7.4 ppm and the phenylene group (derived from BPA skeletal structure) at around 7.0 to 7.3 ppm. Here, details of the measurement conditions of $^1$H-NMR are as shown above.

A whole terminal group amount of the polymer can be calculated from the terminal hydroxyl group concentration and the terminal phenyl group concentration.

4) N value: Using a Koka-type flow tester CFT-500D (manufactured by Shimadzu Corporation), with respect to an aromatic polycarbonate (sample) which had been dried at 130° C. for 5 hours, a melt flow volume per a unit time was measured at 280° C. and a load of 160 kg and taken as Q160 value, and a melt flow volume per a unit time was measured at 280° C. and a load of 10 kg and taken as Q10 value, and, using these values measured, an N value was determined from the following formula (1).

$$N \text{ value} = (\log(Q160 \text{ value}) - \log(Q10 \text{ value}))/(\log 160 - \log 10) \quad (1)$$

5) Heat detention test for a resin: 1 g of a sample resin was placed in a test tube, and dried using a block heater set at 120° C. in a glove box purged with nitrogen (oxygen concentration: 0.0%) for 2 hours. Subsequently, the resin was subjected to heat detention using the block heater set at 360° C. in the same glove box for 60 minutes. With respect to the resin before and after the heat detention test, the molecular weight (Mw) retaining ratio (%) and a change of the YI value were measured. This test is a test in which a resin experiences a heat history at a temperature at the highest level of a general molding temperature for a polycarbonate, for example, a temperature in precision molding which needs to keep the melt viscosity of the resin low. The detention time used in the test, which is as long as 60 minutes, is selected as the longest possible detention time employed in an actual site for molding, including, for example, a time for dealing with apparatus troubles.

6) Hue (YI value) of a resin before and after the heat detention test: 1 g of a resin sample was dissolved in 30 ml of methylene chloride, and the resultant solution was placed in a cell having an optical path length of 20 mm, and measured in YI value using a spectrophotometer (trade name "SE-2000", manufactured by Nippon Denshoku Industries Co., Ltd.).

7) Cyclic carbonate content of a resin: 1 g of a resin sample was dissolved in 10 ml of dichloromethane, and the resultant solution was dropwise added to 100 ml of methanol while stirring. The precipitate was separated by filtration, and from the resultant supernatant was removed the solvent. The obtained solid material was subjected to GC-MS analysis under the measurement conditions shown below. The detection limit of the analysis under the measurement conditions is 0.005 ppm.

[GC-MS Measurement Conditions]
Measurement apparatus: Agilent HP6890/5973MSD
Column: Capillary column DB-5MS; 30 m×0.25 mm I.D.; film thickness: 0.5 μm
Temperature-rising conditions: 50° C. (5 min hold)—300° C. (15 min hold), 10° C./min
Injection inlet temperature: 300° C.; Amount of the injected sample: 1.0 μL (split ratio: 25)
Ionization method: EI method
Carrier gas: He, 1.0 ml/min
Aux temperature: 300° C.
Mass scan range: 33-700
Solvent: Chloroform for HPLC
Internal standard substance: 1,3,5-Trimethylolphenol Here, chemical purities of the aliphatic diol compound used hereinbelow Examples and Comparative examples are each 98 to 99%, a chlorine content is 0.8 ppm or less, contents of an alkali metal, an alkaline earth metal, titanium and a heavy metal (iron, nickel, chromium, zinc, copper, manganese, cobalt, molybdenum, tin) are each 1 ppm or less. Chemical purities of the aromatic dihydroxy compound and the carbonate diester are 99% or more, a chlorine content is 0.8 ppm or less, contents of an alkali metal, an alkaline earth metal, titanium and a heavy metal (iron, nickel, chromium, zinc, copper, manganese, cobalt, molybdenum, tin) are each 1 ppm or less.

Hereinbelow Examples, 2,2-bis(4-hydroxyphenyl)propane may be abbreviated to as "BPA", a prepolymer as "PP", diphenyl carbonate as "DPC", a hydroxyl group as "OH group" and a phenyl group as "Ph".

Preparation Example 1

Preparation Example for Polycarbonate Prepolymer 10,000.6 g (43.808 mol) of 2,2-bis(4-hydroxyphenyl) propane, 10,557 g (49.295 mol) of diphenyl carbonate, and cesium carbonate as a catalyst in an amount of 1.0 μmol/mol-BPA {wherein the amount of the catalyst was calculated in terms of a molar amount per mol of 2,2-bis(4-hydroxyphenyl)propane} were placed in a 50-L SUS reactor equipped with a stirrer and a distilling apparatus, and the system was purged with a nitrogen atmosphere. The degree of vacuum in the system was adjusted to 27 kPaA (200 torr), and the heating medium was set at 205° C., and the raw materials were heat-melted and then stirred.

Then, the temperature of the heating medium was gradually elevated and, while reducing the degree of vacuum in the reaction system, phenol, which was distilled off the reaction system, was condensed by a condenser and removed, effecting a transesterification reaction. The reaction was conducted for about 4 hours so that the temperature and the degree of vacuum in the system finally became 260° C. and 0.13 kPaA (1 torr) or less, respectively, and then the reaction was continued for another 1 hour. The obtained polycarbonate prepolymer had a weight average molecular weight (Mw) of 21,700, a terminal hydroxyl group concentration of 60 ppm, and a phenyl terminal concentration (Ph terminal concentration) of 5.0 mol %.

The terminal hydroxyl group concentration is a value calculated by $^1$H-NMR, and indicates a terminal hydroxyl group concentration of the whole polymer. The Ph terminal concentration is a value calculated by $^1$H-NMR, and indicates a phenyl group (including a phenyl group substituted with a hydroxyl group) terminal concentration of the whole of the phenylene groups and phenyl terminals.

Example 1

30.3724 g of the above-obtained polycarbonate prepolymer was placed in a 300 cc four-necked flask equipped with a stirrer and a distilling apparatus, and heat-melted at 280° C. 0.3203 g (0.001632 mol) of 1,3-adamantanedimethanol as an aliphatic diol compound was added to the melted prepolymer, and the resultant mixture was stirred and kneaded at a jacket temperature of 280° C. under atmospheric pressure for 3 minutes. Subsequently, the mixture was stirred and kneaded under a pressure adjusted to 0.04 kPaA (0.3 torr) at 280° C. for 60 minutes to effect a transesterification reaction. Phenol, which was distilled off the reaction system, was condensed by a condenser to obtain a polycarbonate resin having a weight average molecular weight (Mw) of 59,000, an N value of 1.22, and a YI value of 1.2. No cyclic carbonate was found.

1 g of the obtained resin was placed in a test tube, and dried using a block heater set at 120° C. in a glove box purged with nitrogen (oxygen concentration: 0.0%) for 2 hours. Subsequently, the resin was subjected to heat detention using the block heater set at 360° C. in the same glove box for 60 minutes. As a result, it was found that, with respect to the resin before and after the heat detention test, the molecular weight (Mw) retaining ratio was 98%, and a change of the YI value was +8.8. The results are shown in Table 1.

Example 2

33.3000 g of the above-obtained polycarbonate prepolymer was placed in a 300 cc four-necked flask equipped with a stirrer and a distilling apparatus, and heat-melted at 280° C. 0.2840 g (0.001772 mol) of 2-butyl-2-ethyl-propane-1, 3-diol as an aliphatic diol compound was added to the melted prepolymer, and the resultant mixture was stirred and kneaded at a jacket temperature of 280° C. under atmospheric pressure for 3 minutes. Subsequently, the mixture was stirred and kneaded under a pressure adjusted to 0.04 kPaA (0.3 torr) at 280° C. for 60 minutes to effect a transesterification reaction. Phenol, a cyclic carbonate (5-butyl-5-ethyl-1,3-dioxan-2-one), and the unreacted 2-butyl-2-ethyl-propane-1,3-diol, which were distilled off the reaction system, were condensed by a condenser and removed to obtain a polycarbonate resin having a weight average molecular weight (Mw) of 56,800, an N value of 1.24, and a YI value of 1.3 and containing a cyclic carbonate (5-butyl-5-ethyl-1,3-dioxan-2-one) in an amount of 150 ppm.

1 g of the obtained resin was placed in a test tube, and dried using a block heater set at 120° C. in a glove box purged with nitrogen (oxygen concentration: 0.0%) for 2 hours. Subsequently, the resin was subjected to heat detention using the block heater set at 360° C. in the same glove box for 60 minutes. As a result, it was found that, with respect to the resin before and after the heat detention test, the molecular weight (Mw) retaining ratio was 97%, and a change of the YI value was +4.7. The results are shown in Table 1.

Comparative Example 1

33.3000 g of the above-obtained polycarbonate prepolymer was placed in a 300 cc four-necked flask equipped with a stirrer and a distilling apparatus, and heat-melted at 280° C. 1.1160 g (0.002545 mol) of 9,9-bis[4-(2-hydroxyethoxy)phenyl]fluorene as an aliphatic diol compound was added to the melted prepolymer, and the resultant mixture was stirred and kneaded at a jacket temperature of 280° C. under atmospheric pressure for 3 minutes. Subsequently, the mixture was stirred and kneaded under a pressure adjusted to 0.04 kPaA (0.3 torr) at 280° C. for 60 minutes to effect a transesterification reaction. Phenol, which was distilled off the reaction system, was condensed by a condenser and removed to obtain a polycarbonate resin having a weight average molecular weight (Mw) of 52,300, an N value of 1.23, and a YI value of 1.1. No cyclic carbonate was found.

1 g of the obtained resin was placed in a test tube, and dried using a block heater set at 120° C. in a glove box purged with nitrogen (oxygen concentration: 0.0%) for 2 hours. Subsequently, the resin was subjected to heat detention using the block heater set at 360° C. in the same glove box for 60 minutes. As a result, it was found that, with respect to the resin before and after the heat detention test, the molecular weight (Mw) retaining ratio was as low as 42%, and a change of the YI value was as high as +57.8. The results are shown in Table 1.

TABLE 1

|  | Example 1 | Example 2 | Comparative example 3 |
|---|---|---|---|
| BPA (g) | 10,000.6 | 10,000.6 | 10,000.6 |
| BPA (mol) | 43.808 | 43.808 | 43.808 |
| DPC (g) | 10557 | 10557 | 10557 |
| DPC (mol) | 49.295 | 49.295 | 49.295 |
| DPC/BPA molar ratio | 1.125 | 1.125 | 1.125 |
| Prepolymer molecular weight (Mw) | 21700 | 21700 | 21700 |
| Terminal hydroxyl group concentration (ppm) | 60 | 60 | 60 |
| Terminal phenyl group concentration (mol %) | 5.0 | 5.0 | 5.0 |
| Aliphatic diol compound | ADM | BEPD | BPEF |
| Diol amount (g) | 0.3203 | 0.2840 | 1.1160 |
| Diol amount (mol) | 0.001632 | 0.001772 | 0.002545 |
| Mw | 59000 | 56800 | 52300 |
| Cyclic carbonate content (ppm) | — | 150 | — |
| N value | 1.22 | 1.24 | 1.23 |
| Molecular weight retaining ratio (%) | 98 | 97 | 42 |

TABLE 1-continued

|  | Example 1 | Example 2 | Comparative example 3 |
|---|---|---|---|
| YI value | 1.2 | 1.3 | 1.1 |
| YI value change | 8.8 | 4.7 | 57.8 |

ADM: 1,3-Adamantanedimethanol
BEPD: 2-Butyl-2-ethylpropane-1,3-diol
BPEF: 9,9-Bis[4-(2-hydroxyethoxy)phenyl]fluorene

INDUSTRIAL APPLICABILITY

By the process of the present invention for preparing a highly polymerized aromatic polycarbonate resin using an aliphatic diol compound having hydroxymethyl groups (HO—CH$_2$—) each bonded to a quaternary carbon atom, there can be obtained a polycarbonate resin which not only has excellent quality such that it has high molecular weight and high fluidity, but also has more excellent heat resistance.

The highly polymerized aromatic polycarbonate resin of the present invention obtained by the above process has advantages in that, when the resin is used as a substitute for a conventional general-purpose polycarbonate resin or a composition thereof, for example, the molding cycle can be shortened, and the molding temperature can be lowered. Therefore, the aromatic polycarbonate resin of the present invention can be preferably used in applications of various shaped articles, sheets, and films obtained by various types of injection molding, blow molding, extrusion, injection blow molding, rotary molding, and compression molding.

Further, the aromatic polycarbonate resin of the present invention is advantageous in that, for example, the electric power used can be reduced, and hence the load on the natural environment and the cost for producing shaped articles are expected to be reduced, and thus the polycarbonate resin can be regarded as an economically excellent and environment-friendly resin. Particularly, even when the aromatic polycarbonate resin experiences a heat history at a temperature at the highest level of a general molding temperature for a polycarbonate for a long period of time, the resin exhibits extremely excellent heat stability such that the molecular weight (Mw) retaining ratio is high (for example, 50% or more) and a change of the YI value is small (for example, +25 or less). Therefore, the aromatic polycarbonate resin can be especially preferably used in, for example, precision molding which needs to keep the melt viscosity of the resin low.

The invention claimed is:

1. A process for preparing a highly polymerized aromatic polycarbonate resin, which comprises a highly polymerizing step including reacting an aromatic polycarbonate prepolymer with adamantanedimethanol to obtain a highly polymerized aromatic polycarbonate resin.

2. The process according to claim 1, wherein an amount of the adamantanedimethanol is 0.01 to 1.0 mol based on 1 mol of the total terminal amount of the aromatic polycarbonate prepolymer before subjected to the reaction in the highly polymerizing step.

3. A highly polymerized aromatic polycarbonate resin which is obtained by the process according to claim 1.

4. The highly polymerized aromatic polycarbonate resin according to claim 3, wherein an N value (structural viscosity index) represented by the following numerical formula (1) is 1.25 or less $$N \text{ value} = (\log(Q160 \text{ value}) - \log(Q10 \text{ value}))/(\log 160 - \log 10) \quad (1).$$

5. The highly polymerized aromatic polycarbonate resin according to claim 3, wherein a molecular weight (Mw) retaining ratio after heat detention test (at 360° C. for 60 minutes) is 50% or more.

* * * * *